United States Patent
Breed

(10) Patent No.: US 9,154,893 B1
(45) Date of Patent: Oct. 6, 2015

(54) SOUND SENSING TECHNIQUES

(71) Applicant: Intelligent Technologies International, Inc., Boonton, NJ (US)

(72) Inventor: David S Breed, Miami Beach, FL (US)

(73) Assignee: Intelligent Technologies International, Inc., Miami Beach, FL (US)

( * ) Notice: Subject to any disclaimer, the term of this patent is extended or adjusted under 35 U.S.C. 154(b) by 342 days.

(21) Appl. No.: 13/714,880

(22) Filed: Dec. 14, 2012

Related U.S. Application Data

(60) Provisional application No. 61/580,710, filed on Dec. 28, 2011.

(51) Int. Cl.
*H04R 29/00* (2006.01)

(52) U.S. Cl.
CPC .................................... *H04R 29/00* (2013.01)

(58) Field of Classification Search
None
See application file for complete search history.

(56) References Cited

U.S. PATENT DOCUMENTS

| | | | |
|---|---|---|---|
| 4,081,784 A * | 3/1978 | Wilson et al. | 367/94 |
| 4,415,979 A * | 11/1983 | Hernandez | 702/56 |
| 4,840,377 A | 6/1989 | Bowser et al. | |
| 4,845,464 A * | 7/1989 | Drori et al. | 340/429 |
| 4,893,924 A | 1/1990 | Leonard et al. | |
| 5,194,847 A | 3/1993 | Taylor et al. | |
| 5,353,009 A | 10/1994 | Marsh et al. | |
| 5,386,368 A | 1/1995 | Knight | |
| 5,532,679 A | 7/1996 | Baxter, Jr. | |
| 5,677,666 A | 10/1997 | Stallbohm | |
| 5,939,987 A * | 8/1999 | Cram | 340/573.2 |
| 5,969,608 A | 10/1999 | Sojdehei et al. | |
| 6,154,131 A | 11/2000 | Jones, II et al. | |
| 6,281,806 B1 | 8/2001 | Smith et al. | |
| 6,288,973 B1 | 9/2001 | Joynes | |
| 6,385,132 B1 | 5/2002 | Sackett | |
| 6,611,755 B1 | 8/2003 | Coffee et al. | |
| 6,919,803 B2 | 7/2005 | Breed | |
| 6,980,483 B2 * | 12/2005 | McDonald | 367/93 |
| 7,002,481 B1 | 2/2006 | Crane et al. | |
| 7,245,559 B2 * | 7/2007 | McDonald et al. | 367/136 |
| 7,290,451 B2 | 11/2007 | Taniguchi et al. | |
| RE40,073 E | 2/2008 | Breed | |
| 7,663,502 B2 | 2/2010 | Breed | |
| 7,747,710 B1 | 6/2010 | Osburn, III et al. | |
| 7,961,094 B2 | 6/2011 | Breed | |
| 8,014,789 B2 | 9/2011 | Breed | |
| 8,024,084 B2 | 9/2011 | Breed | |
| 8,035,508 B2 | 10/2011 | Breed | |
| 8,214,219 B2 | 7/2012 | Prieto et al. | |
| 8,219,110 B1 * | 7/2012 | White et al. | 455/456.1 |
| 8,242,621 B1 * | 8/2012 | Tate et al. | 290/53 |
| 8,284,041 B2 | 10/2012 | Cuddihy et al. | |

(Continued)

FOREIGN PATENT DOCUMENTS

JP 2006234480 A * 9/2006

*Primary Examiner* — Brenda Bernardi
(74) *Attorney, Agent, or Firm* — Brian Roffe

(57) ABSTRACT

System for monitoring an environment, such as a vehicular environment, including at least one sound-receiving/vibration-detecting component that receives sounds from an environment in or around the vehicle, a processor coupled to the at least one sound-receiving/vibration-detecting component and that analyzes the sounds to identify non-speech sounds, and a communications device coupled to the processor that transmits a signal, data or information about analysis by the processor of the identified non-speech sounds.

19 Claims, 3 Drawing Sheets

(56) References Cited

U.S. PATENT DOCUMENTS

| | | |
|---|---|---|
| 8,552,838 B2 | 10/2013 | Addy |
| 8,581,688 B2 | 11/2013 | Breed |
| 8,653,967 B1* | 2/2014 | Vosburgh ................. 340/539.26 |
| 8,710,983 B2 | 4/2014 | Malkowski |
| 9,000,918 B1 | 4/2015 | McLaughlin et al. |
| 2001/0040508 A1 | 11/2001 | Janning et al. |
| 2004/0056779 A1* | 3/2004 | Rast .............................. 340/985 |
| 2006/0167595 A1 | 7/2006 | Breed et al. |
| 2006/0181413 A1 | 8/2006 | Mostov |
| 2007/0205893 A1 | 9/2007 | Mainini et al. |
| 2007/0222663 A1 | 9/2007 | Humphrey et al. |
| 2008/0195261 A1 | 8/2008 | Breed |
| 2009/0058593 A1 | 3/2009 | Breed |
| 2009/0201190 A1 | 8/2009 | Huthoefer et al. |
| 2009/0252196 A1 | 10/2009 | Icove et al. |
| 2011/0012734 A1* | 1/2011 | Reese et al. .................... 340/541 |
| 2011/0089696 A1* | 4/2011 | Davis et al. ...................... 290/53 |
| 2011/0144930 A1* | 6/2011 | Bruno et al. ..................... 702/56 |
| 2011/0227733 A1* | 9/2011 | Kelly et al. ..................... 340/541 |
| 2012/0248865 A1* | 10/2012 | Eder et al. ...................... 307/9.1 |

* cited by examiner

SOUND SENSING TECHNIQUES

CROSS REFERENCE TO RELATED APPLICATION

This application claims priority under 35 U.S.C. §119(e) of U.S. provisional patent application Ser. No. 61/580,710 filed Dec. 28, 2011, which is incorporated by reference herein.

FIELD OF THE INVENTION

The present invention relates generally to techniques for recognizing sounds or vibrations, and more specifically techniques for recognizing sounds in an environment in and around, or generally related to, a vehicle or a road on which a vehicle travels. More particularly, the invention relates to methods and system for detecting recognizing sounds or vibrations in an environment in or around a land vehicle, such as an automobile and truck, or on or around a roadway for the purpose of implementing a response to the detection and recognition of particular sounds or vibrations.

BACKGROUND OF THE INVENTION

In U.S. patents by the inventor, various applications of sound-recognition techniques are disclosed.

For example, U.S. Pat. No. 7,663,502 discloses an occupant sensor that determines the presence and health state of any occupants in the vehicle by analyzing sounds emanating from the passenger compartment. Such sounds, or an interpretation or derivative thereof, can be directed, e.g., using telematics, to a remote, manned site for consideration in dispatching response personnel.

In one embodiment, presence determining means, health state determining means and location determining means obtain readings from the passenger compartment and direct such readings to a processor. The processor analyzes the information and directs or controls the transmission of the information about the occupant(s) to a remote, manned facility. Such information could include the number and type of occupants, i.e., adults, children, infants, whether any of the occupants have stopped breathing or are breathing erratically, whether the occupants are conscious (as evidenced by, e.g., eye motion), whether blood is present (as detected by a chemical sensor) and whether the occupants are making sounds (as detected by a microphone). The communications link through a communications unit can be activated immediately after the crash to enable personnel at the remote facility to initiate communications with the vehicle.

U.S. Pat. No. 6,919,803 (reissued as U.S. RE 40073) discloses a method for monitoring movable assets and inanimate contents in the assets in which a replaceable cell phone or PDA having a location providing function and a low duty cycle is mounted on the asset, the location of the asset is determined, and information about the inanimate contents of the asset other than the location of the asset is also determined. The information determining step comprises arranging at least one wave receiver on the asset in a position to receive waves from the interior of the asset and comparing waves received by the at least one wave receiver at different times such that the information about the inanimate contents of the asset are obtained based on the comparison of the waves received by the at least one wave receiver at different times. Communications between the cell phone or PDA and the asset enable the cell phone or PDA to obtain the determined location of the asset and the determined information about the inanimate contents of the asset. A communications channel is established between the cell phone or PDA and a location remote from the asset to enable the information about the asset and its inanimate contents to be transmitted to the remote location. When a cell phone is mounted to the asset, the cell phone has a sound-receiving component, in which case, a pattern recognition system may be provided in the cell phone to recognize events relating to the asset based on sounds received by the sound-receiving component.

U.S. Pat. No. 8,014,789 discloses a method of determining a location of a cell phone or PDA at a location apart from the cell phone or PDA by obtaining information at the cell phone or PDA relating to reception of signals by the cell phone or PDA, transmitting the obtained information from the cell phone or PDA to a remote facility situated separate and apart from the cell phone or PDA, monitoring received sounds at the cell phone or PDA via a microphone of the cell phone or PDA, and programming the cell phone or PDA to analyze the received sounds. This latter step may entail training the cell phone or PDA to recognize the sounds of accidents involving a vehicle. Then, an accident indication signal may be transmitted to the remote facility when a sound of an accident involving the vehicle is recognized from the monitored received sounds. At the remote facility, the location of the cell phone or PDA is determined from the information transmitted from the cell phone or PDA when the accident indication signal is received.

U.S. Pat. No. 8,035,508 discloses a method for obtaining information about a person when in a vehicle or the vehicle, comprising providing the person with a portable device, arranging at least one sensor on the portable device, the at least one sensor including a microphone, and receiving information from the at least one sensor of the portable device when the portable device is situated in the vehicle. Information may be received from the at least one sensor by receiving sounds via the microphone of the portable device. Further, information about the person, the vehicle or an environment around the person is obtained using the at least one sensor of the portable device without manual interaction, e.g., by, inter alia, programming the portable device to analyze the information received from the at least one sensor to determine whether the information is indicative of an accident involving the vehicle. Programming the portable device to analyze the information may entail programming the portable device to analyze the received sounds via the microphone of the portable device. A signal based on the analysis of the received information from the at least one sensor of the portable device when situated in the vehicle may be transmitted to a remote facility including a signal based on the determination of whether the information is indicative of an accident involving the vehicle. The transmission of the signal based on the analysis of the received information entails transmitting to the remote facility, a signal indicative of the received sounds including the sound of an accident involving the vehicle or the sound of deployment of an airbag of the vehicle that would deploy to protect an occupant of the vehicle during an accident involving the vehicle. In some embodiments, the portable device is trained to recognize the sounds of accidents, for example, using pattern recognition techniques, such that the signal indicative of the receiving sounds being transmitted to the remote facility is an accident indication signal when the sound of an accident is recognized. Additionally or alternatively, the portable device may be trained to recognize the sounds of deployment of an airbag of the vehicle such that the signal indicative of the receiving sounds being transmitted to the remote facility is an airbag deployment signal when the sound of an airbag deployment is recognized.

All of these patents, along with U.S. Pat. No. 8,024,084, are incorporated by reference herein.

OBJECTS AND SUMMARY OF THE INVENTION

It is an object of the present invention to improve on the techniques disclosed in the above-mentioned patents.

Accordingly, a general embodiment of a technique in accordance with the invention includes recognizing sounds or vibrations in the environment in or around a vehicle or roadway and undertaking one or more actions in response to recognition of specific sounds or vibrations. The action may be transmitting an indication of the recognition of the sounds or vibrations to one or more remote sites, each separate and apart from the vehicle, this indication may be an identification of a probable source of the sounds or vibrations. Additionally or alternatively, recognition of the sounds or vibrations may be used by one or more components of the vehicle, i.e., on-board components other than a communications system that is transmitting the indication to the remote site.

Another monitoring system in accordance with the invention includes at least one sound-receiving/vibration-detecting component that receives sounds and detects vibrations, a processor coupled to the sound-receiving/vibration-detecting component(s) and that analyzes the sounds and vibrations to identify presence or existence of one of a number of pre-determined alarm-generating conditions, and an alarm system coupled to the processor and that is activated when the processor identifies the presence of one of the pre-determined alarm-generating conditions. The alarm system is an example of a responsive system that reacts to the identified presence of a pre-determined alarm-generating condition. The sound-receiving/vibration-detecting component(s) and processor may be arranged in a self-contained housing, and an energy generating/harvesting system arranged in connection with this housing to provide power to the sound-receiving/vibration-detecting component(s) and processor.

If the sound-receiving/vibration-detecting component is adapted for placement alongside a road, possibly along with the entire housing, the processor is configured to analyze sounds and vibrations to identify the presence of animals, e.g., deer that can cause potentially fatal accidents to occupants of vehicles that might hit a deer. As such, one of the pre-determined alarm-generating conditions is the presence of relatively large animals on or near the road. In this case, the alarm system could include a communications device that transmits a signal indicative of the identification of the presence of the relatively large animals to a remote site. This signal is then processed at the remote site by a monitoring unit including a processor, and a signal may then be transmitted wirelessly to vehicles travelling on the road. The wireless transmission may be made from transmitters along the road and operative at least in the area in which the alarm-generating condition was detected.

A method for automatically conveying information about a condition in accordance with the invention includes arranging a monitoring system at a fixed location to be monitored, the monitoring system being generally as described above, i.e., including at least one sound-receiving/vibration-detecting component that receives sounds and detects vibrations and a processor coupled to the at least one sound-receiving/vibration-detecting component and that analyzes the sounds and vibrations to identify presence of one of a number of pre-determined conditions. The method also includes receiving sounds or detecting vibrations caused by movement of objects around the monitoring system, by means of the at least one sound-receiving/vibration-detecting component, analyzing any received sounds and detected vibrations to identify presence of one of a number of pre-determined conditions, by means of the processor, and when the presence of one of the pre-determined conditions is identified, transmitting a signal indicative of the condition to a remote site using a communications system. The fixed location at which the monitoring system is arranged is determined, from memory about locations of monitoring systems or using a location determining system co-located with the monitoring system, and finally, a signal is directed from the remote site to entities interested in the identification of the condition based on the determined location at which the condition is identified.

As used herein, the term "sounds" includes, but is not limited to sirens, alarms, buzzers, sound of collisions, sounds of distress such as human screams and animal cries, and the like.

BRIEF DESCRIPTION OF THE DRAWINGS

The following drawing is illustrative of an embodiment of a system developed or adapted using the teachings of at least one of the inventions disclosed herein and is not meant to limit the scope of the invention as will be eventually encompassed by the claims.

DETAILED DESCRIPTION OF THE INVENTION

Figure 1:
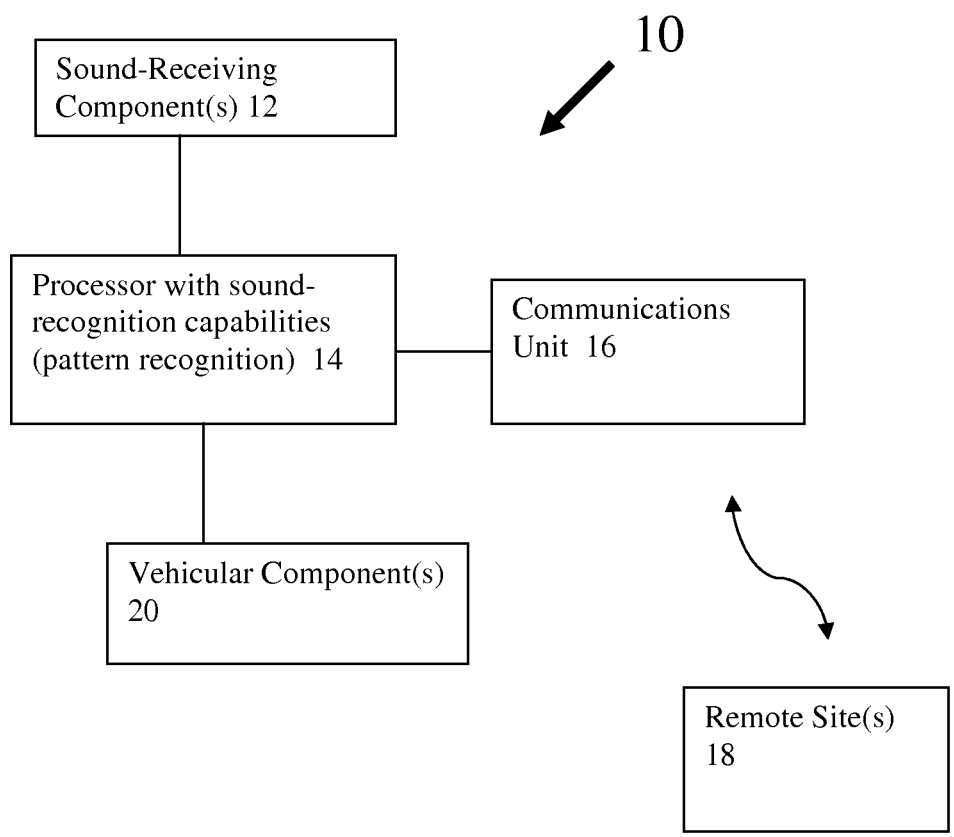
FIG. 1 is a schematic of a system in accordance with the invention that utilizes techniques for recognizing sounds in an environment in and around a vehicle.

Referring to the accompanying drawings wherein like reference numerals refer to the same or similar elements, FIG. 1 shows a system in accordance with the invention that is designated generally as 10 and includes one or more sound-receiving/vibration-detecting components 12, e.g., microphone, that are each mounted or otherwise arranged in or on a vehicle, and a processor 14 coupled to the sound-receiving/vibration-detecting components 12. Processor 14 preferably includes a pattern recognition system, or another type of system that is capable of analyzing received sounds and/or detected vibrations to determine desired information, described more fully below. Processor 14 may embody the pattern recognition system on computer media, e.g., as a software program stored and executed in a conventional manner.

A communications device 16 is coupled to the processor 14 and transmits signals, data or information about analysis of the sounds received by the sound-receiving/vibration-detecting components 12 that is performed by the processor 14, or vibrations detected thereby. The communications device 16 transmits the signals, data and/or information to one or more remote sites 18 separate and apart from the vehicle, i.e., these sites not being located on the vehicle. This transmission may occur as the vehicle is travelling and moving along a road, although transmission while the vehicle is stationary also possible. The same signals, data and/or information may also be provided to one or more components 20 on the vehicle for their use, e.g., to undertake an action responsive to the detection and recognition of a particular sound or group of sounds, or vibration or group of vibrations.

The processor 14 may be configured to use pattern recognition (e.g., neural networks) to identify sounds relating to collisions, noises from injured people, vehicle diagnostics, etc., as well as to identify objects and conditions relating to vibrations More generally, pattern recognition may be used to identify the presence of one of a predetermined number of alarm-generating conditions that can be detected by analysis of sound and/or vibrations. Such conditions are any conditions for which the sound-monitoring system is used to detect their presence.

The sound-receiving/vibration-detecting component 12 may be part of a cellular telephone, smartphone or PDA, see U.S. Pat. No. 8,014,789 mentioned above, or more generally any hand-held device. The hand-held device may be independently usable as a communications device outside of the vehicle, and removably or detachably coupled to the vehicle for use in combination with the vehicle-resident processor and/or vehicle-resident communications device.

Alternatively, the system 10 may be implemented entirely on a hand-held device, such as a cellular telephone, smartphone or PDA, with the sound-receiving/vibration-detecting component 12, processor 14 and communications device 16 all being part of this hand-held device. The system would operate when the hand-held device is situated in a vehicle, and would be trained to recognize sounds or vibrations particular to a vehicle, e.g., a crash or collision involving the vehicle, airbag deployment, and the like. In this case, system 10 would be useable when detached and outside of all vehicles.

Communications device 16, in any configuration, may be configured to generate and send a message to the remote site 18 relating to and/or uniquely responsive to the detected and recognized sounds or vibrations. A message might include terms like "airbag deployment", "front impact crash", and the like. Conventional message protocol may be used, as known to those skilled in the communications art.

A processor 14 may be configured to use modular neural networks (combination neural nets) would be most applicable. A first neural network could segment the noise into various initial categories followed by a more complete classification at another layer, or another neural network.

In addition to microphones, the sound-receiving/vibration-detecting components 12 may include sensors or apparatus that record vibrations such as accelerometers, all of which are coupled to the processor 14.

The detected sounds and/or vibrations may be run through a Fast Fourier Transform (FFT), through hardware and/or software resident with the sound-receiving/vibration-detecting component 12 and/or at the processor 14. Other pre-processing of the detected sounds and/or vibrations prior to application to a sound/vibration-recognition technique may also be used in accordance with the invention.

Additional material that may be used in the invention includes that disclosed in U.S. patent application Ser. No. 11/923,929, U.S. Pat. Appin. Publ. No. 2008/0195261), all of which is incorporated by reference herein. For example, the '929 application discloses a sound sensor to sense and recognize sound associated with the deployment or of a crash, transmission of a signal of the crash, a neural network or other pattern recognition system used in the sound recognition process, a neural network to recognize a person, as well as a combination neural network, detecting whether a person is making a sound, e.g., crying, and a Fourier transfer used with optics and implied that it can be used with ultrasonics.

The processor 14 is configured so that it can detect and identify non-speech sounds, e.g., sounds of a crash or airbag deployment. Additional non-speech sounds include sirens, alarms, buzzers, sound of collisions, sounds of distress such as human screams and animal cries, etc. The system 10 may be used in an environment which both speech sounds and multiple non-speech sounds are detected. The processor 14 is preferably designed to process the sounds and vibrations in real-time, i.e., have a high processing time. The size of the system, including microphone or other sound-receiving components/vibration-detecting 12 and processor 14, will be small so that it preferably can be carried by a person and thus would be operative when the person is in the vehicle. The processor 14 may also include technology to separate such non-speech sounds from speech sounds and to identify types of the sounds.

System 10 is explained with reference to a vehicle-mounted application. However, a similar system may be used in a non-vehicular mounted application in which recognition of additional sounds and vibrations is desired.

Figure 2:
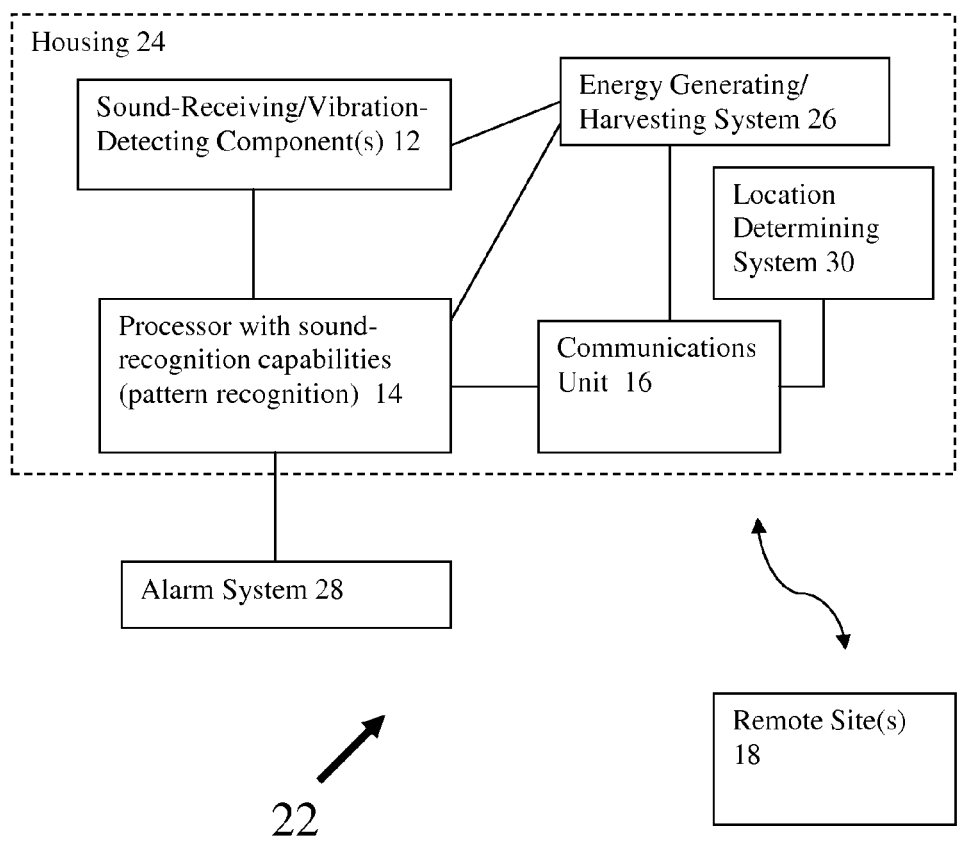
FIG. 2 is a schematic of a system in accordance with the invention that utilizes techniques for recognizing sounds in a non-vehicular mounted environment.

Referring now to FIG. 2, a system 22 includes one or more sound-receiving/vibration-detecting components 12, a processor 14 and a communications device 16 as described above, all of which are preferably arranged in a self-contained housing 24. In this embodiment, the communications device 16 is optional and when present, transmits the signals, data and/or information to one or more remote sites 18 separate and apart from the housing 24, i.e., these sites not being located on the housing. This transmission may occur periodically at set time intervals, based on conditions detected around the housing, based on the frequency at which conditions are detected, and at variable frequencies depending on changes in the monitoring environment.

Housing 24 is placed, installed, mounted or otherwise arranged at the location at which sound/vibration-monitoring is desired. For example, the housing 24 may be placed near a roadway to sense the presence of deer or other animals proximate or on the roadway. To this end, the processor 14 may be configured to use pattern recognition (e.g., neural nets) to identify sounds or vibrations relating to objects passing near the roadway, such as people, deer or other animals.

System 22 also preferably includes an energy generating/harvesting system 26, such as a solar collector, that generates energy needed by the other components of the system 22 to which it is connected, i.e., the sound-receiving/vibration-detecting components 12, processor 14 and optional communications device 16. By providing the energy generating/harvesting system in connection with the housing 24, the need to connect the housing 24 and components therein to a remote source of electricity via wires is eliminated.

Information obtained by the sound-monitoring system 22 can be used to alert approaching drivers of vehicles on the monitored roadway by means of an alarm system 28 coupled to the processor 14. Alarm system 28 may be separate from and attached to the housing 24, or integrated into or within the housing 24. Alarm system 28 may be configured to provide a visual alarm, such as by a flashing light, and/or an audible alarm such as by emitting a sound. Alarm system 28, when providing a visual alarm, is positioned to be visible to the intended recipients.

Additionally or alternatively, communications device 16 may be used as an alarm system to generate an electronic alarm by sending a radio frequency signal which can be received by approaching vehicles or which can be used by a processor at a remote site 18 to place a message on a map which would be transmitted to the vehicles in the area. The radio frequency signal is derived from the identification of the sounds and/or vibrations as being one of a predetermined number of conditions being monitored by the monitoring system 22.

Figure 3:
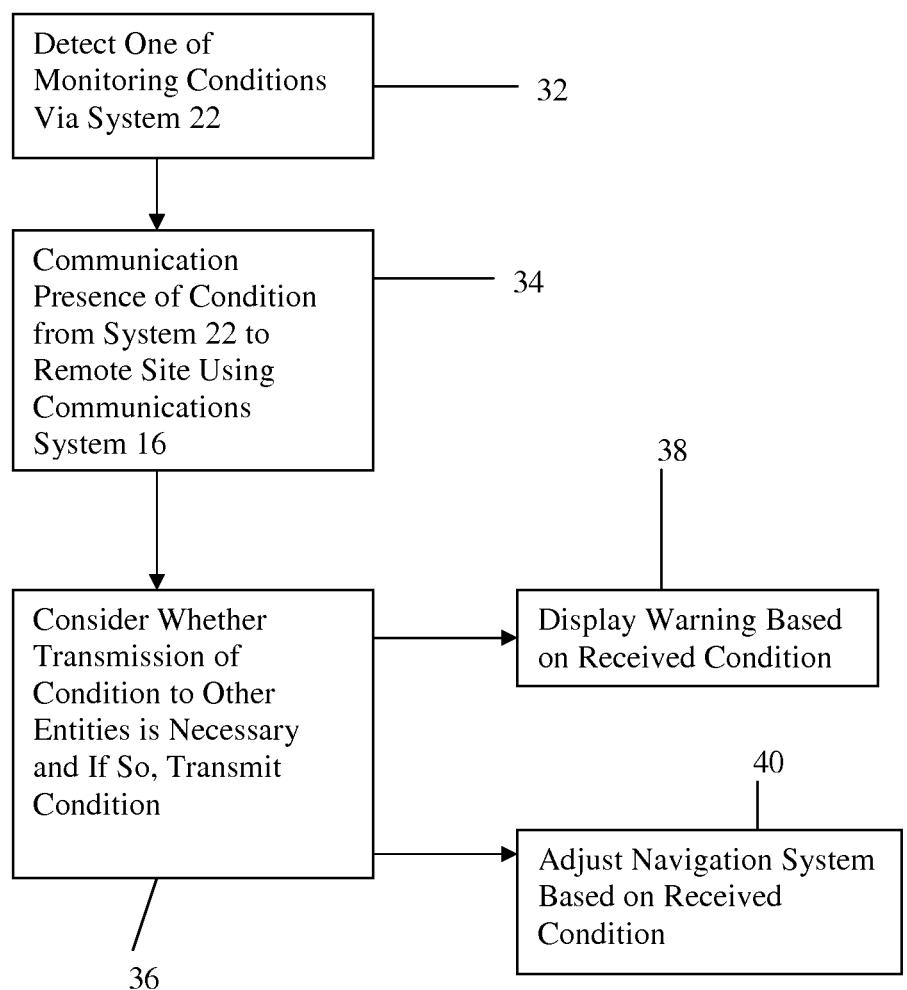
FIG. 3 is a flow chart showing one manner in which an alarm-generating condition is detected by a system in accordance with the invention and communicated to interested parties.

Referring in this regard to FIG. 3, in step 32, one of monitoring conditions is detected via system 22, and in step 34, the presence of the condition is transmitted from system 22 to the remote site 18 using communications system 16. At the remote site, a processor considers whether transmission of the condition to other entities is necessary and if so, directs a transmission system or communications network to transmit the condition, in step 36. Upon receipt of the transmission from the remote site 18, a warning may be caused to be displayed, e.g., on a sign next to the road along which the condition was detected (step 38), and ideally in advance of the location at which the condition was detected in the direction of travel along the road. The location at which the condition is detected may be provided in the transmission relating to the condition from the communications system 16, whether the housing 24 is fixed at a location and the location initially provided to the remote site, or whether the housing 24 includes a location determining system 30 that determines its location and enables the location to be included in the outgoing transmissions.

Additionally or alternatively, the transmission is made in a protocol of a navigation system on a vehicle and it causes the navigation system to be adjusted to display the condition when the location at which the condition was detected is shown on the navigation system display.

In the latter situation, the processor at the remote site 18 would convert the radio frequency signal from the communications device 16 into an indication to be added to a map of the road, and send the addition wirelessly to vehicles in the vicinity of the road. For example, commands from the remote site 18, generated by the processor thereat, may be designed to cause an on-board vehicle processor that controls a navigation system to generate an icon on the display of the navigation system representing deer if the system 22 determines the presence of deer near the roadway. A driver is thus forewarned of deer prior to approaching the section of the road near where deer were detected by system 22, thereby potentially preventing an accident between the vehicle and deer.

Communications device 16, in any configuration, may be configured to generate and send a message to the remote site 18 relating to or uniquely responsive to the detected and recognized sounds. A message might include terms like "deer near roadway", and the like. This may be supplemental to the actions undertaken by the alarm system 28 upon command from the processor 14.

System 22 shown in FIG. 2 is not only applicable for use alongside a road but also in marine applications. For example, housing 24 may be placed on a buoy in the ocean where it would listen for submarines or ships and report their presence. In this case, the energy generating/harvesting system 26 may be one based on wave motion. The buoy is fixed at a location sought to be monitored, and remains fixed at this location, i.e., even though it moves with waves, this wave-based movement does not change its fixing at the location.

System 22 is also applicable on national borders or on the perimeters of sensitive areas to detect footprints or other sounds which could the emitted by people attempting to cross the border or penetrate into a secure area. One application for this would be for detecting people attempting to enter secured areas around airports. Again, energy harvesting, probably solar, could be used to essentially permit an infinite life for the device.

In another variant, system 10 or 22 may be modified to include a GPS chip to indicate the location of the system and thus of the sound or vibration. Embodied as a location determining system 30 in FIG. 2, this embodiment would be most helpful when the housing 24 of system 22 is movable, such as when attached to a buoy. Nevertheless, it may be useful even when the housing 24 is fixed because, through its coupling to the communications device 16, it enables the location of the housing 24 as determined by the location determining system 30 to be included in transmissions from the communications device 16, as mentioned above, thereby providing an integral association between the detected sounds and their location in the transmissions.

System 22 could also be used to count passage of vehicles on a roadway for example or other similar counting functions.

Finally, all of the techniques disclosed in the above-mentioned patents may be incorporated together with one another and/or with the techniques first disclosed herein and all such combinations are considered by the inventor to be his invention.

Although several preferred embodiments are illustrated and described above, there are possible combinations using other geometries, sensors, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

I claim:

1. A vehicle travel lane monitoring system that monitors non-vehicular objects alongside the travel lane, comprising:
   at least one sound-receiving/vibration-detecting component alongside the travel lane and that receives sounds from non-vehicular objects on or alongside the travel lane and/or detects vibrations from non-vehicular objects on or alongside the travel lane;
   a processor coupled to said at least one sound-receiving/vibration-detecting component and that analyzes the sounds and/or vibrations to identify non-speech sounds or vibrations, said processor being further configured to analyze sounds and/or vibrations to identify animals on or alongside the travel lane; and
   a communications device coupled to said processor that transmits a signal, data or information about analysis by said processor of the identified non-speech sounds and any identified animals on or alongside the travel lane.

2. The system of claim 1, wherein said at least one sound-receiving/vibration-detecting component comprises a microphone or accelerometer.

3. The system of claim 1, wherein said processor is trained to identify non-speech sounds or vibrations in a training stage.

4. The system of claim 1, wherein said processor comprises a pattern recognition system trained to identify non-speech sounds.

5. The system of claim 4, wherein the non-speech sounds said pattern recognition system is trained to identify include sirens, alarms, buzzers, sound of collisions, and sounds of distress.

6. The system of claim 1, wherein said processor comprises a pattern recognition system trained to identify non-speech sounds or vibrations in a training stage.

7. A vehicle travel lane monitoring system that monitors non-vehicular objects alongside the travel lane, comprising:
at least one sound-receiving/vibration-detecting component that receives sounds from non-vehicular objects on or alongside the travel lane and/or detects vibrations from non-vehicular objects on or alongside the travel lane;
a processor coupled to said at least one sound-receiving/vibration-detecting component and that analyzes the received sounds and/or detected vibrations to identify presence of one of a plurality of different pre-determined alarm-generating conditions derived from presence of non-vehicular objects on or alongside the travel lane; and
an alarm system coupled to said processor and that is activated when said processor identifies the presence of one of the pre-determined alarm-generating conditions, said alarm system being configured to provide notification to a vehicle travelling in the travel lane about the presence of the pre-determined alarm-generating condition.

8. The system of claim 7, wherein said at least one sound-receiving/vibration-detecting component and said processor are arranged in a self-contained housing.

9. The system of claim 8, further comprising an energy generating/harvesting system arranged in connection with said housing to provide power to said at least one sound-receiving/vibration-detecting component and said processor.

10. The system of claim 9, wherein said energy generating/harvesting system comprises a solar collector.

11. The system of claim 7, wherein said processor is configured to analyze sounds and/or vibrations to identify animals such that one of the pre-determined alarm-generating conditions is the presence of large animals on or alongside the travel lane.

12. The system of claim 11, wherein said alarm system comprises a communications device that transmits a signal indicative of the identification of the presence of large animals to a remote site, the signal being processed at the remote site and transmitted wirelessly to vehicles travelling on the travel lane.

13. The system of claim 7, wherein said alarm system comprises a visual alarm or an audible alarm.

14. A method for automatically conveying information about a condition on or alongside a travel lane on which vehicles travel, comprising:
arranging a monitoring system at a fixed location to be monitored on or alongside the travel lane, the monitoring system including at least one sound-receiving/vibration-detecting component that receives sounds from non-vehicular objects on or alongside the travel lane and/or detects vibrations from non-vehicular objects on or alongside the travel lane and a processor coupled to the at least one sound-receiving/vibration-detecting component and configured to analyze the received sounds and/or detected vibrations to identify presence of one of a plurality of different pre-determined conditions derived from presence of non-vehicular objects on or alongside the travel lane;
receiving sounds and/or detecting vibrations caused by movement of non-vehicular objects on or alongside the travel lane, by means of the at least one sound-receiving/vibration-detecting component;
analyzing any received sounds and/or detected vibrations to identify presence of one of a plurality of different pre-determined conditions, by means of the processor;
when the presence of one of the pre-determined conditions is identified, transmitting a signal indicative of the condition to a remote site using a communications system;
determining the fixed location at which the monitoring system is arranged; and
directing a vehicle-targeted signal from the remote site to vehicles travelling on the travel lane based on the determined fixed location of the monitoring system at which the condition is identified.

15. The method of claim 14, further comprising housing the at least one sound-receiving/vibration-detecting component and the processor in a self-contained housing.

16. The method of claim 14, wherein the step of directing a signal from the remote site to vehicles travelling on the travel lane based on the determined fixed location of the monitoring system at which the condition is identified comprises providing a visual alarm visible to an occupant of the vehicle about the condition.

17. The method of claim 14, wherein the step of directing a signal from the remote site to vehicles travelling on the travel lane based on the determined fixed location of the monitoring system at which the condition is identified comprises providing an audible alarm to an occupant of the vehicle about the condition.

18. The method of claim 14, wherein the step of analyzing any received sounds and/or detected vibrations to identify presence of one of a plurality of different pre-determined conditions, by means of the processor comprises analyzing received sounds to identify animals on or alongside the travel lane such that one of the pre-determined alarm-generating conditions is the presence of large animals on or alongside the travel lane.

19. The method of claim 14, wherein the step of analyzing any received sounds and/or detected vibrations to identify presence of one of a plurality of different pre-determined conditions, by means of the processor comprises analyzing detected vibrations to identify animals on or alongside the travel lane such that one of the pre-determined alarm-generating conditions is the presence of large animals on or alongside the travel lane.

* * * * *